US011881136B2

(12) United States Patent
Cheng et al.

(10) Patent No.: US 11,881,136 B2
(45) Date of Patent: Jan. 23, 2024

(54) DISPLAY DRIVER FOR REDUCING REDUNDANT POWER WASTE AND HEAT AND DRIVING METHOD THEREOF

(71) Applicant: NOVATEK MICROELECTRONICS CORP., Hsinchu (TW)

(72) Inventors: Jhih-Siou Cheng, New Taipei (TW); Yen-Ru Kuo, Taoyuan (TW); Chih-Hsien Chou, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 2 days.

(21) Appl. No.: 17/646,198

(22) Filed: Dec. 28, 2021

(65) Prior Publication Data

US 2023/0206801 A1 Jun. 29, 2023

(51) Int. Cl.
*G09G 3/20* (2006.01)

(52) U.S. Cl.
CPC ....... *G09G 3/20* (2013.01); *G09G 2310/0289* (2013.01); *G09G 2310/0291* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2006/0109229 A1* 5/2006 Iwabuchi ............. G09G 3/3688 345/98
2007/0090983 A1* 4/2007 Yen ...................... G09G 3/3685 341/155
2008/0116942 A1* 5/2008 Chen .................... G09G 3/3696 327/103
2008/0191553 A1* 8/2008 Kawamura ............ G09G 3/296 307/31
2008/0259013 A1* 10/2008 Kobayashi ............... G09G 3/20 345/89
2009/0189882 A1* 7/2009 Huang ................. G09G 3/3688 345/87
2012/0299904 A1* 11/2012 Shih ......................... G09G 3/20 345/213

* cited by examiner

*Primary Examiner* — Amr A Awad
*Assistant Examiner* — Donna V Bocar
(74) *Attorney, Agent, or Firm* — Rosenberg, Klein & Lee

(57) ABSTRACT

A display driver and a driving method thereof is disclosed. The display driver includes at least one first latch, at least one second latch, an output buffer, and a comparator. The first latch receives input data. The input terminal of the second latch is coupled to the output terminal of the first latch. The output buffer, including at least one variable current source, is coupled to the second latch. The comparator is coupled to the first latch, the second latch, and the variable current source. The comparator generates at least one control signal of the variable current source.

8 Claims, 12 Drawing Sheets

DISPLAY DRIVER FOR REDUCING REDUNDANT POWER WASTE AND HEAT AND DRIVING METHOD THEREOF

BACKGROUND OF THE INVENTION

Field of the Invention

The invention relates to the driving technology, particularly to a display driver and a driving method thereof.

Description of the Related Art

A liquid crystal display (LCD) monitor has characteristics of light weight, low power consumption, zero radiation, etc. and is widely used in many information technology (IT) products, such as computer systems, mobile phones, and personal digital assistants (PDAs).

FIG. 1 is a diagram schematically illustrating a conventional display device. FIG. 2 is a diagram schematically illustrating the waveforms of a source driver output enable signal, an output signal, and a high driving signal of a conventional display device. Referring to FIG. 1 and FIG. 2, a display device 1 includes a liquid crystal display panel 10, a gate driver 11, and a source driver 12. The display panel 10 includes a plurality of pixels. Each pixel is composed of a thin-film transistor (TFT). Generally, the source driver 12 is configured to drive a plurality of data lines (or source lines) of the display panel 10. The source driver 12 is configured with a plurality of drive channel circuits. Each of the plurality of drive channel circuits drives a corresponding data line of the plurality of data lines by different output buffers 120. In the source driver 12, the output buffer 120 may output the output signal Y of a digital to analog converter (DAC) to the data line of the display panel 10. The larger the size of the display panel 10, the more the number of the pixels. As the resolution of the display panel 10 and/or the frame rate gets higher and higher, the charging time for a scan line gets shorter and shorter. To drive (charge or discharge) a pixel in a short period of time, the output buffer 120 needs to have enough drive ability. That is, the output buffer 120 needs to have enough slew rate. To enhance the slew rate, the source driver 12 receives a source driver output enable signal SOE and a high driving signal HDR. The source driver output enable signal SOE includes a plurality of voltage pulses periodically generated. The high driving signal HDR includes a plurality of voltage pulses periodically generated. During each time period T0, T1, and T2, one voltage pulse of the source driver output enable signal SOE and one voltage pulse of the high driving signal HDR are generated. When the voltage pulse of the source driver output enable signal SOE is generated, the source driver 12 gradually stops transferring old data to the corresponding data line but transfers new data to the corresponding data line. If the difference between the old data and the new data is smaller, the voltage of the output signal Y will be constant. For example, the output signal Y maintains a constant voltage during time period T0 and T2. If the difference between the old data and the new data is larger, the voltage of the output signal Y will vary. For example, the output signal Y descends from a high voltage to a low voltage during time period T1. When the voltage pulse of the high driving signal HDR is generated, the tail current of the output buffer 120 is statically increased to enhance slew rate. However, the increase of the slew rate indicates the increase of power consumption. Since the voltage pulse of the high driving signal HDR is periodically generated, the power consumption of the source driver 12 will greatly increase. Besides, the number of the drive channel circuits will increase to produce too much heat or cause high power consumption when the size of the display panel 10 is larger.

SUMMARY OF THE INVENTION

The invention provides a display driver and a driving method thereof, which reduce redundant power waste and heat and achieve the maximum power efficiency under a constant refresh rate.

In an embodiment of the invention, a display driver for driving a display panel includes at least one first latch, at least one second latch, an output buffer, and a comparator. The first latch receives input data. The input terminal of the second latch is coupled to the output terminal of the first latch. The output buffer, including at least one variable current source, is coupled to the second latch. The comparator is coupled to the first latch, the second latch, and the variable current source. The comparator generates at least one control signal of the variable current source.

In an embodiment of the invention, a driving method including: sequentially receiving first data and second data; transferring the first data to an output buffer to drive a display panel in a first period, wherein the output buffer includes at least one variable current source; controlling the variable current source according to a given value and a difference between values of the first data and the second data; and transferring the second data to the output buffer to drive the display panel in a second period, wherein the second period separates from the first period by a transition period and the output buffer with the at least one controlled variable current source drives the display panel in the transition period.

To sum up, the display driver and the driving method control the variable current source according to the given value and the difference between values of the first data and the second data, thereby reducing redundant power waste and heat and achieving the maximum power efficiency under a constant refresh rate.

Below, the embodiments are described in detail in cooperation with the drawings to make easily understood the technical contents, characteristics and accomplishments of the invention.

DETAILED DESCRIPTION OF THE INVENTION

Figure 1:
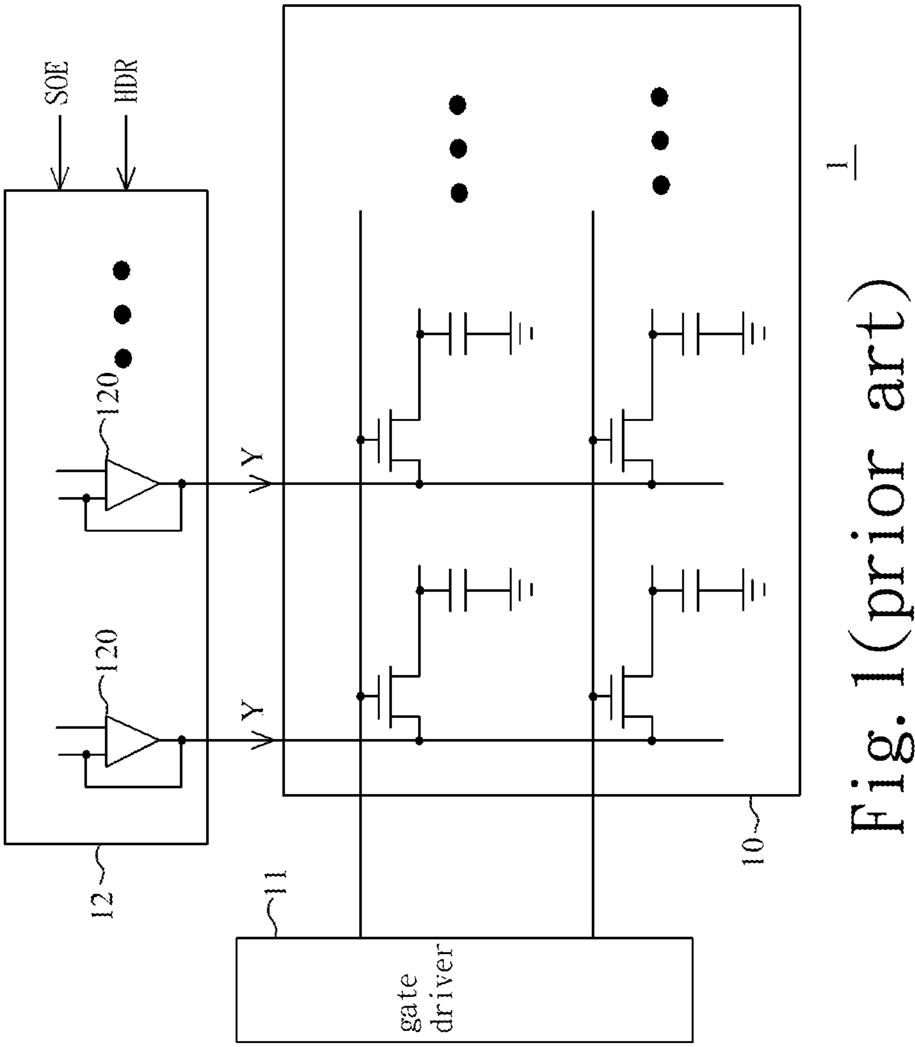
Fig. 1(prior art)
FIG. 1 is a diagram schematically illustrating a conventional display device.
Figure 2:
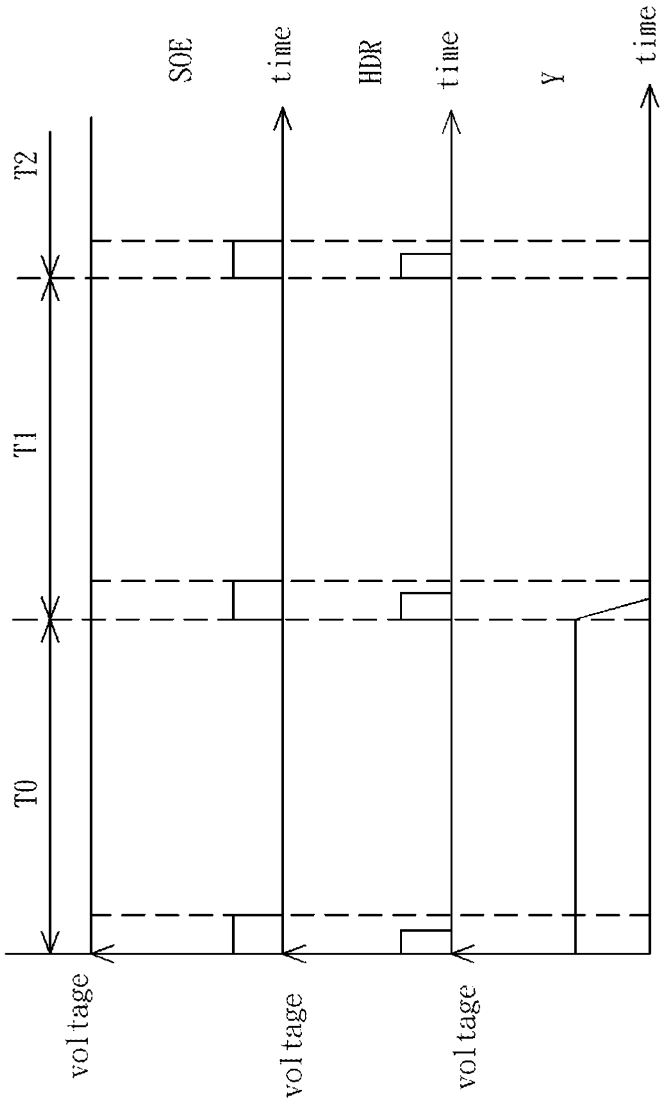
Fig. 2(prior art)
FIG. 2 is a diagram illustrating the waveforms of a source driver output enable signal, an output signal, and a high driving signal of a conventional display device.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following description, a display driver and a driving method will be provided. The display driver and the driving method control at least one variable current source according to a given value and a difference between values of first data and second data, thereby reducing redundant power waste and heat and achieving the maximum power efficiency under a constant refresh rate. The display drivers provided below may also be applied to other circuit configurations.

Figure 3:
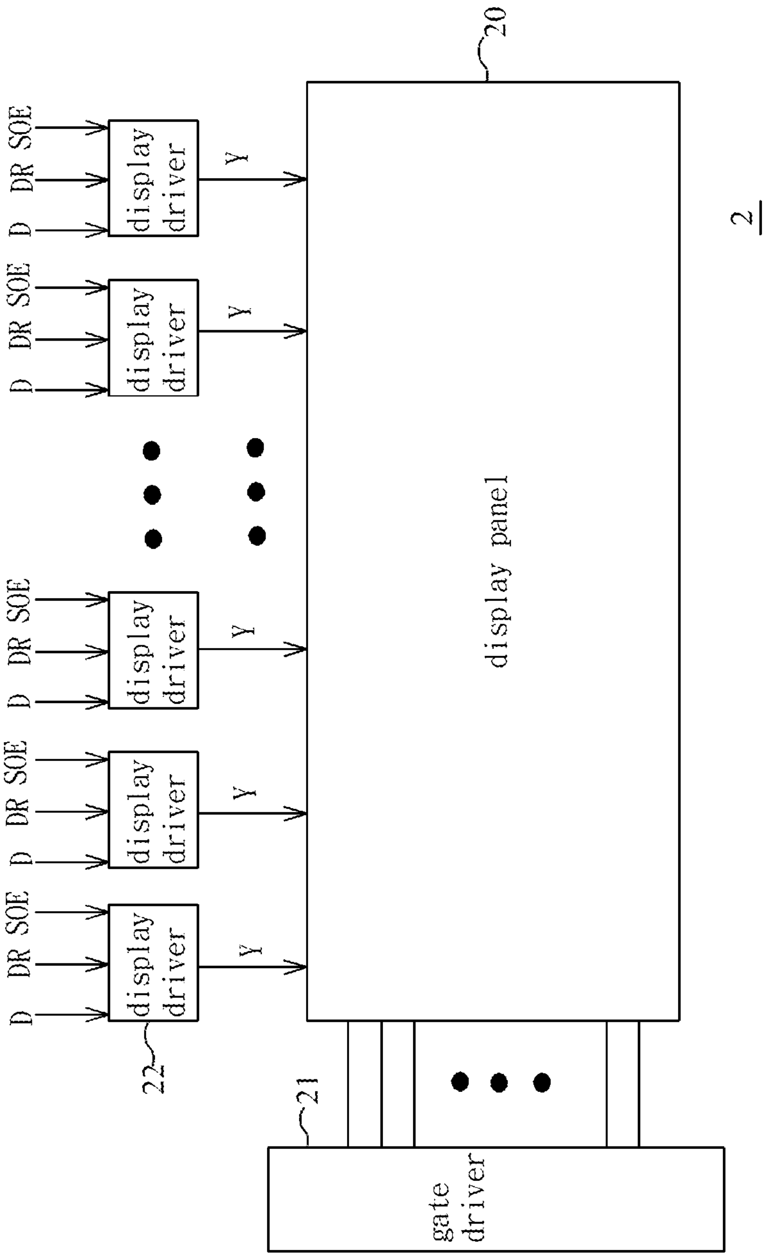
FIG. 3 is a diagram schematically illustrating a display device according to an embodiment of the invention.

FIG. 3 is a diagram schematically illustrating a display device according to an embodiment of the invention. Referring to FIG. 3, a display device 2 is introduced as follows. The display device 2 includes a display panel 20, a gate driver 21, and a plurality of display drivers 22. The display drivers 22 are used as source drivers. The display panel 20 is coupled to the gate driver 21 and each display driver 22. Each display driver 22 receives input data D, a source driver output enable signal SOE, and a driving signal DR to generate an output signal Y and drive the display panel 20.

Figure 4:
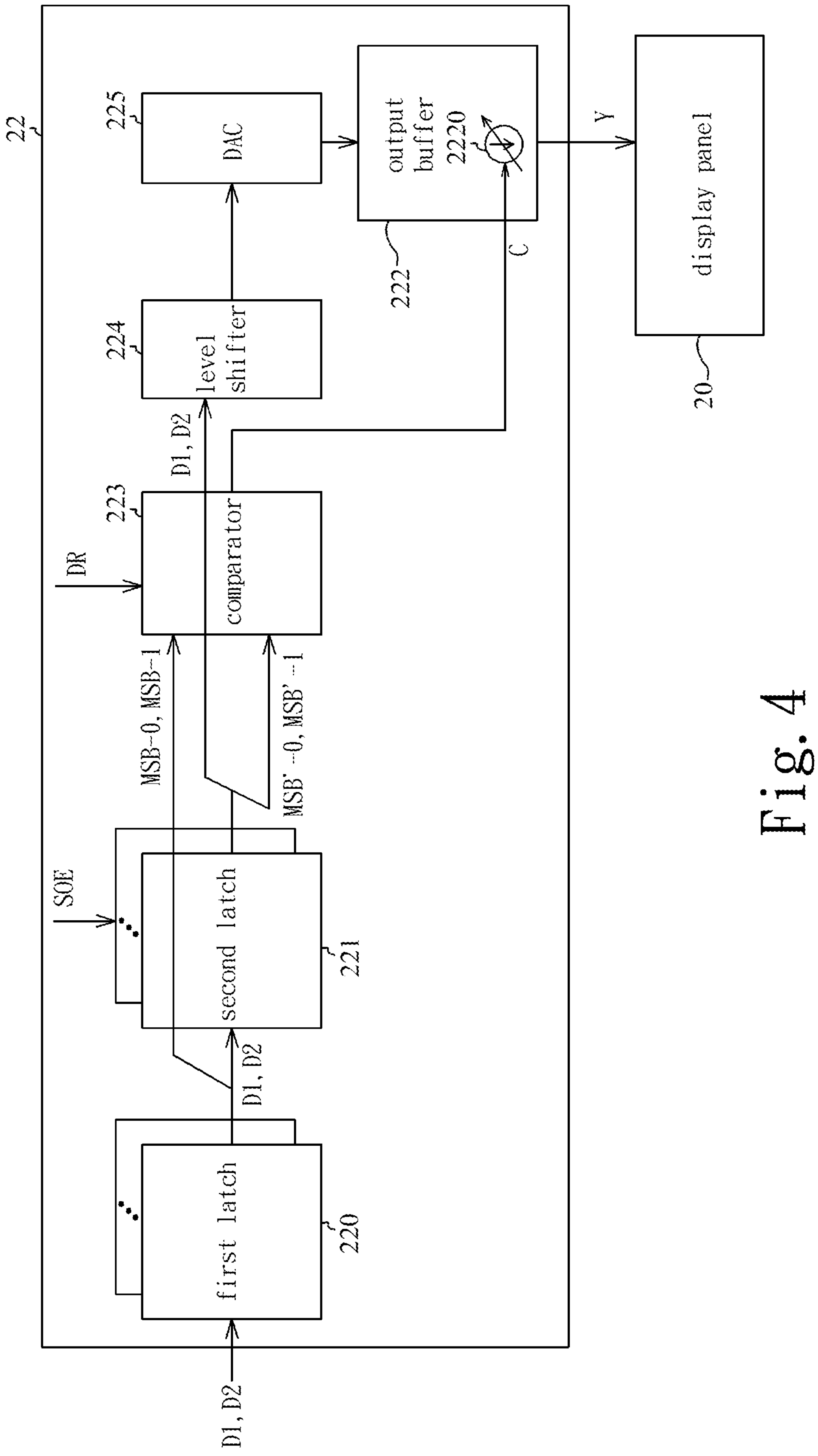
FIG. 4 is a diagram schematically illustrating a display driver according to an embodiment of the invention.

FIG. 4 is a diagram schematically illustrating a display driver according to an embodiment of the invention. Referring to FIG. 4, a display driver 22 includes at least one first latch 220, at least one second latch 221, an output buffer 222, and a comparator 223. The input terminal of the second latch 221 is coupled to the output terminal of the first latch 220. The output buffer 222 includes at least one variable current source 2220, such as a part of a tail current source or the other biasing current source. The input terminal of the output buffer 222 is coupled to the output terminal of the second latch 221. The output terminal of the output buffer 222 is coupled to the display panel 20. The input terminals of the comparator 223 are coupled to the output terminals of the first latch 220 and the second latch 221. The output terminal of the comparator 223 is coupled to the variable current source 2220. For clarity and convenience, the first embodiment exemplifies a plurality of first latches 220, a plurality of second latches 221, and one variable current source 2220. The number of the first latches 220 may be equal to that of the second latches 221. The invention is not limited to the numbers of the first latch 220, the second latch 221, and the variable current source 2220.

In another embodiment, the display driver 22 may further includes a level shifter 224 and a digital-to-analog converter (DAC) 225. The DAC 225 is coupled between the level shifter 224 and the output buffer 222. The level shifter 224 is coupled between the DAC 225 and the second latches 221. The level shifter 224 can shift the output signal of the second latch 221 from a voltage level to another. The DAC 225 performs digital-to-analog conversion on the output signal from the level shifter 224. In some embodiments, the level shifter 224 can be omitted according to requirements. When the level shifter 224 is omitted, the DAC 225 is coupled between the second latches 221 and the output buffer 222. In such a case, the DAC 225 performs digital-to-analog conversion on the output data from the second latches 221.

Figure 5:
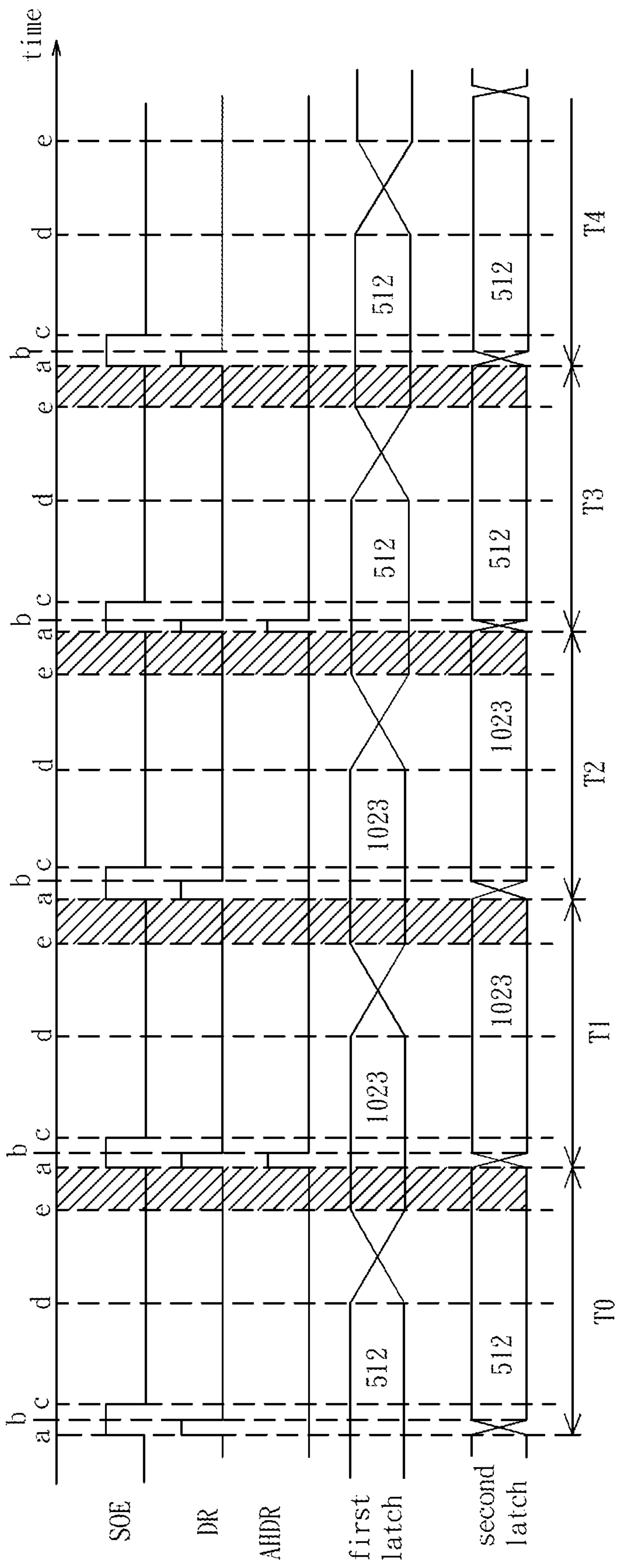
FIG. 5 is a timing diagram illustrating a source driver output enable signal, a driving signal, an adaptive driving signal, and data outputted by a first latch and a second latch of a display driver according to an embodiment of the invention.

FIG. 5 is a timing diagram illustrating a source driver output enable signal SOE, a driving signal DR, an adaptive driving signal AHDR, and data outputted by a first latch and a second latch of a display driver according to an embodiment of the invention. Referring to FIG. 4 and FIG. 5, the driving method of the display driver 22 is introduced as follows. The first latches 220 receive the input data D including first data D1 and second data D2. That is to say, the first latches 220 sequentially receive the first data D1 and the second data D2. The timing of the first data D1 is earlier than that of the second data D2. The first latches 220 sequentially transfer the first data D1 and the second data D2 to the second latches 221. The second latches 221 receive the source driver output enable signal SOE, and transfer the first data D1 to the output buffer 222 to output the output signal Y and drive the display panel 20 in a first period. Simultaneously, the first latches 220 and the second latches 221 respectively transfer the second data D2 and the first data D1 to the comparator 223. The comparator 223 receives the driving signal DR, and generates at least one control signal C of the variable current source 2220 according to a given value and a difference between values of the first data D1 and the second data D2. The first embodiment exemplifies one control signal C, but the invention is not limited to the number of the control signal C. The control signal C can control the variable current source 2220. For example, the control signal C may turn on the variable current source 2220 when the difference is greater than the given value. The time of turning on the variable current source 2220 may be positively correlated with the difference. Alternatively, the control signal C may turn off the variable current source 2220 when the difference is less than or equal to the given value. Then, the second latches 221 transfer the second data D2 that replaces the first data D1 to the output buffer 222 to output the output signal Y and drive the display panel 20 in a second period. The second period separates from the first period by a transition period. The output buffer 222 with the controlled variable current source 2220 drives the display panel 20 in the transition period. Provided that substantially the same result is achieved, the steps of the driving method need not be in the exact order shown and need not be contiguous, that is, other steps can be intermediate.

In some embodiment of the invention, each of the first data D1 and the second data D2 may have N bits. N is a natural number greater than 1. The difference of the values between the first data D1 and the second data D2 may be obtained by comparing the first-most significant bit MSB-0 and the second-most significant bit MSB-1 of the second data D2 and the first-most significant bit MSB'-0 and the second-most significant bit MSB'-1 of the first data D1. The binary code of the given value may be 00, but the invention is not limited thereto. The source driver output enable signal SOE includes a plurality of voltage pulses periodically generated. The voltage pulses of the source driver output enable signal SOE are respectively generated in time period T0, T1, T3, and T4. The driving signal DR includes a plurality of voltage pulses periodically generated. The voltage pulses of the driving signal DR are respectively generated in time period T0, T1, T3, and T4. Assume that N=10. In time period T0 and T1, the first data D1 may be 1000000000 and the second data may be 1111111111. Thus, the value of the first data D1 is 512 and the value of the second data D2 is 1023. The first-most significant bit MSB-0 and the second-most significant bit MSB-1 of the second data D2 are respectively 1 and 1. The first-most significant bit MSB'-0 and the second-most significant bit MSB'-1 of the first data D1 are respectively 1 and 0. The difference between the values of the first data D1 and the second data D2 is greater than the given value since the difference between 11 and 10 is greater than 00. The first period is viewed as a period between time point e of time period T0 and time point a of time period T1, as illustrated by a section line. The transition period is viewed as a period between time point a and b of time period T1. The second period is viewed as a period between time point b and e of time period T1. In the first period, the first latches 220 transfer the second data D2 to the second latches 221 and the comparator 223, the second latches 221 transfer the first data D1 to the output buffer 222 and the comparator 223, and the comparator 223 determines that the difference between the values of the first data D1 and the second data D2 is greater than the given value. In the transition period, the voltage pulse of the source driver output enable signal SOE is generated such that the second latches 221 gradually stop transferring the first data D1 to the output buffer 222 but transfer the second data D2 to the output buffer 222. Besides, the voltage pulse of the driving signal DR is generated in the transition period. The comparator 223 turns on the variable current source 2220 in response to the voltage pulse of the driving signal DR since the difference between the values of the first data D1 and the second data D2 is greater than the given value. Turning on the variable current source 2220 is like generating a voltage pulse of an adaptive high driving signal AHDR. The width of the voltage pulse of the adaptive high driving signal AHDR represents the time of turning on the variable current source 2220. The width of the voltage pulse of the driving signal DR is equal to that of the voltage pulse of the adaptive high driving signal AHDR. In the transition period, the output buffer 222 with the turned-on variable current source 2220 increases the slew rate to drive the display panel 20. In the second period, the second latches 221 transfer the second data D2 to the output buffer 222 to drive the display panel 20.

In time period T2 and T3, the value of the first data D1 is 1023 and the value of the second data D2 is 512. The driving method of the display driver 22 in time period T2 and T3 is similar to the driving method of the display driver 22 in time period T0 and T1 so will not be reiterated.

In time period T1 and T2, the first data D1 and the second data may be 1111111111. Thus, the value of the first data D1 is 1023 and the value of the second data D2 is 1023. The first-most significant bit MSB-0 and the second-most significant bit MSB-1 of the second data D2 are respectively 1 and 1. The first-most significant bit MSB'-0 and the second-most significant bit MSB'-1 of the first data D1 are respectively 1 and 1. The difference between the values of the first data D1 and the second data D2 is equal to the given value since the difference between 11 and 11 is equal to 00. The first period is viewed as a period between time point e of time period T1 and time point a of time period T2, as illustrated by a section line. The transition period is viewed as a period between time point a and b of time period T2. The second period is viewed as a period between time point b and e of time period T2. In the first period, the comparator 223 determines that the difference between the values of the first data D1 and the second data D2 is equal to the given value. The voltage pulse of the driving signal DR is generated in the transition period. The comparator 223 turns off the variable current source 2220 since the difference between the values of the first data D1 and the second data D2 is equal to the given value. In the transition period, the output buffer 222 with the turned-off variable current source 2220 drives the display panel 20 without increasing the slew rate. In the second period, the second latches 221 transfer the second data D2 to the output buffer 222 to drive the display panel 20.

Table 1 shows values corresponding to the first-most significant bit MSB-0 and the second-most significant bit MSB-1. Table 2 shows values corresponding to the first-most significant bit MSB'-0 and the second-most significant bit MSB'-1.

TABLE 1

| MSB-0 | MSB-1 | Value |
|---|---|---|
| 0 | 0 | 0~255 |
| 0 | 1 | 256~511 |
| 1 | 0 | 512~767 |
| 1 | 1 | 768~1023 |

TABLE 2

| MSB'-0 | MSB'-1 | Value |
|---|---|---|
| 0 | 0 | 0~255 |
| 0 | 1 | 256~511 |
| 1 | 0 | 512~767 |
| 1 | 1 | 768~1023 |

Figure 6:
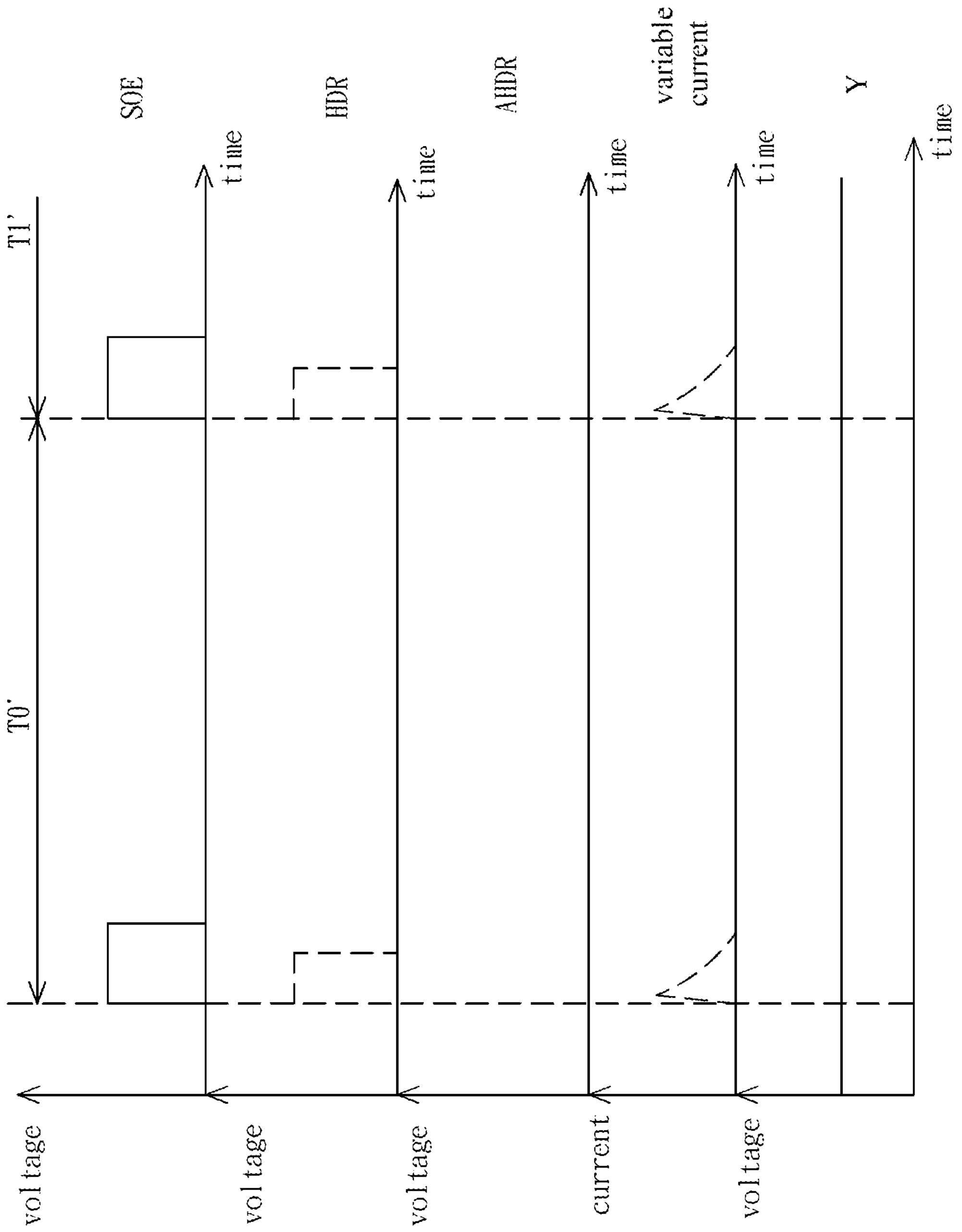
FIG. 6 is a diagram illustrating the waveforms of a conventional high driving signal and a source driver output enable signal, an adaptive high driving signal, a variable current, and an output signal of a display driver according to an embodiment of the invention.

FIG. 6 is a diagram illustrating the waveforms of a conventional high driving signal HDR and a source driver output enable signal SOE, an adaptive high driving signal AHDR, a variable current, and an output signal Y of a display driver according to an embodiment of the invention. Referring to FIG. 6 and FIG. 4, the display driver 22 receive the voltage pulse of a high driving signal HDR to turn on the variable current source 2220 and increase the variable current when the voltage pulse of the source driver output enable signal SOE is generated in each time period T0' and T1'. The power waste of the display driver 22 increases as the variable current increases. However, the adaptive high driving signal AHDR and the output signal Y maintain a constant voltage since the difference between the values of the first data D1 and the second data D2 is less than or equal to the given value. As a result, compared with the conventional high driving signal HDR, the adaptive high driving signal AHDR can reduce redundant power waste and heat and achieve the maximum power efficiency under a constant refresh rate.

Figure 7:
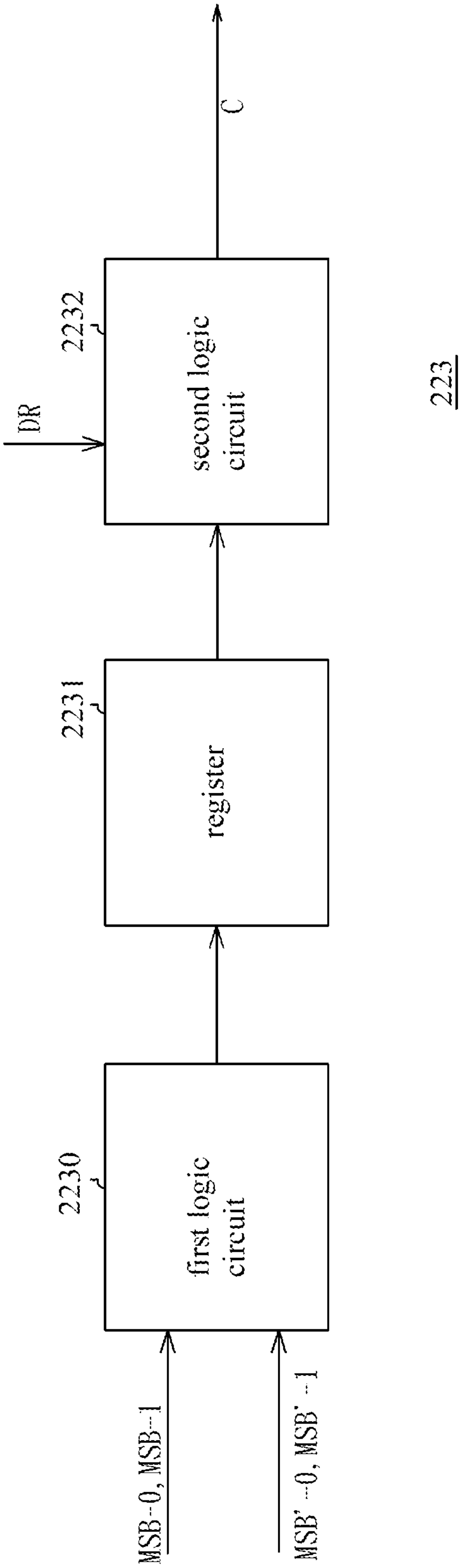
FIG. 7 is a diagram schematically illustrating a comparator according to an embodiment of the invention.

FIG. 7 is a diagram schematically illustrating a comparator according to an embodiment of the invention. Referring to FIG. 7 and FIG. 4, the comparator 223 may include a first logic circuit 2230, a register 2231, and a second logic circuit 2232. The first logic circuit 2230 is coupled to the first latches 220 and the second latches 221. The register 2231 is coupled to the first logic circuit 2230. The second logic circuit 2232 is coupled to the register 2231 and the variable current source 2220. The first logic circuit 2230 receives and performs logic operation on the first-most significant bit MSB-0 and the second-most significant bit MSB-1 of the second data D2 and the first-most significant bit MSB'-0 and the second-most significant bit MSB'-1 of the first data D1 to generate at least one logic value. The register 2231 receives and stores the logic value. The second logic circuit 2232 receives the driving signal DR. When the voltage pulse of the driving signal DR is generated, the second logic circuit 2232 retrieves the logic value from the register 2231. The second logic circuit 2232 performs logic operation on the logic value to generate the control signal C. The architecture in FIG. 7 may be applied to the architecture in FIG. 4 or the other embodiments, but the invention is not limited to such the comparator 223 in FIG. 7.

Figure 8:
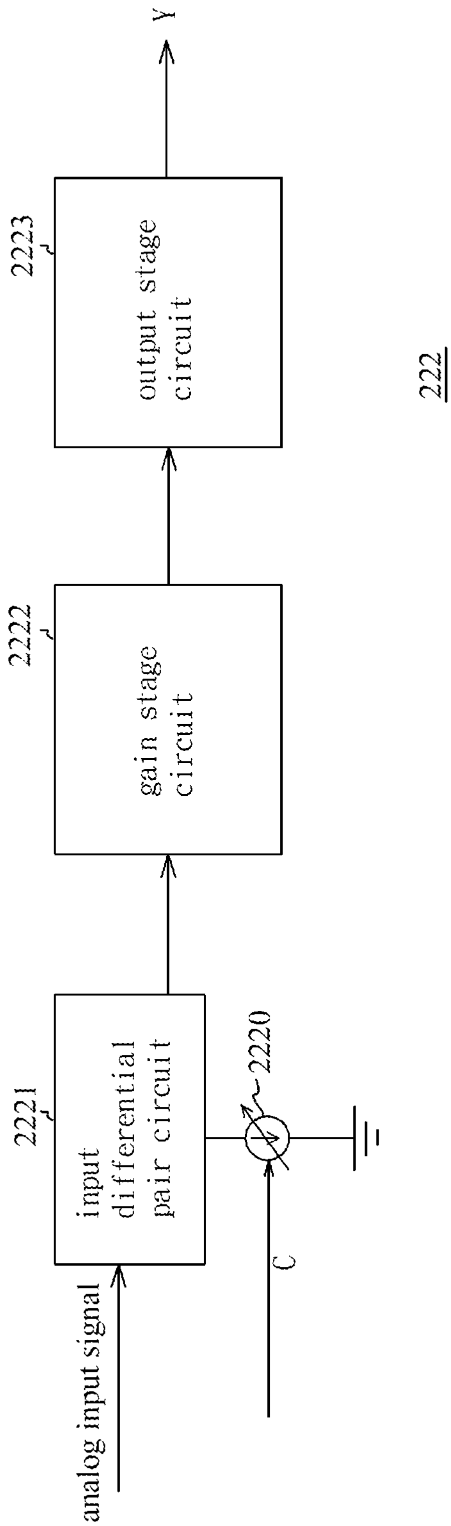
FIG. 8 is a diagram schematically illustrating an output buffer according to an embodiment of the invention.

FIG. 8 is a diagram schematically illustrating an output buffer according to an embodiment of the invention. Referring to FIG. 8 and FIG. 4, the output buffer 222 may further include an input differential pair circuit 2221, a gain stage circuit 2222, and an output stage circuit 2223. The input differential pair circuit 2221 is coupled to the DAC 225 and the variable current source 2220. The gain stage circuit 2222 is coupled to the input differential pair circuit 2221. The output stage circuit 2223 is coupled to the gain stage circuit 2222 and the display panel 20. The input differential pair circuit 2221 receives an analog input signal to generate the output signal Y for driving the display panel 20. The architecture in FIG. 8 may be applied to the architecture in FIG. 4 or the other embodiments, but the invention is not limited to such the output buffer 222 in FIG. 8.

Figure 9:
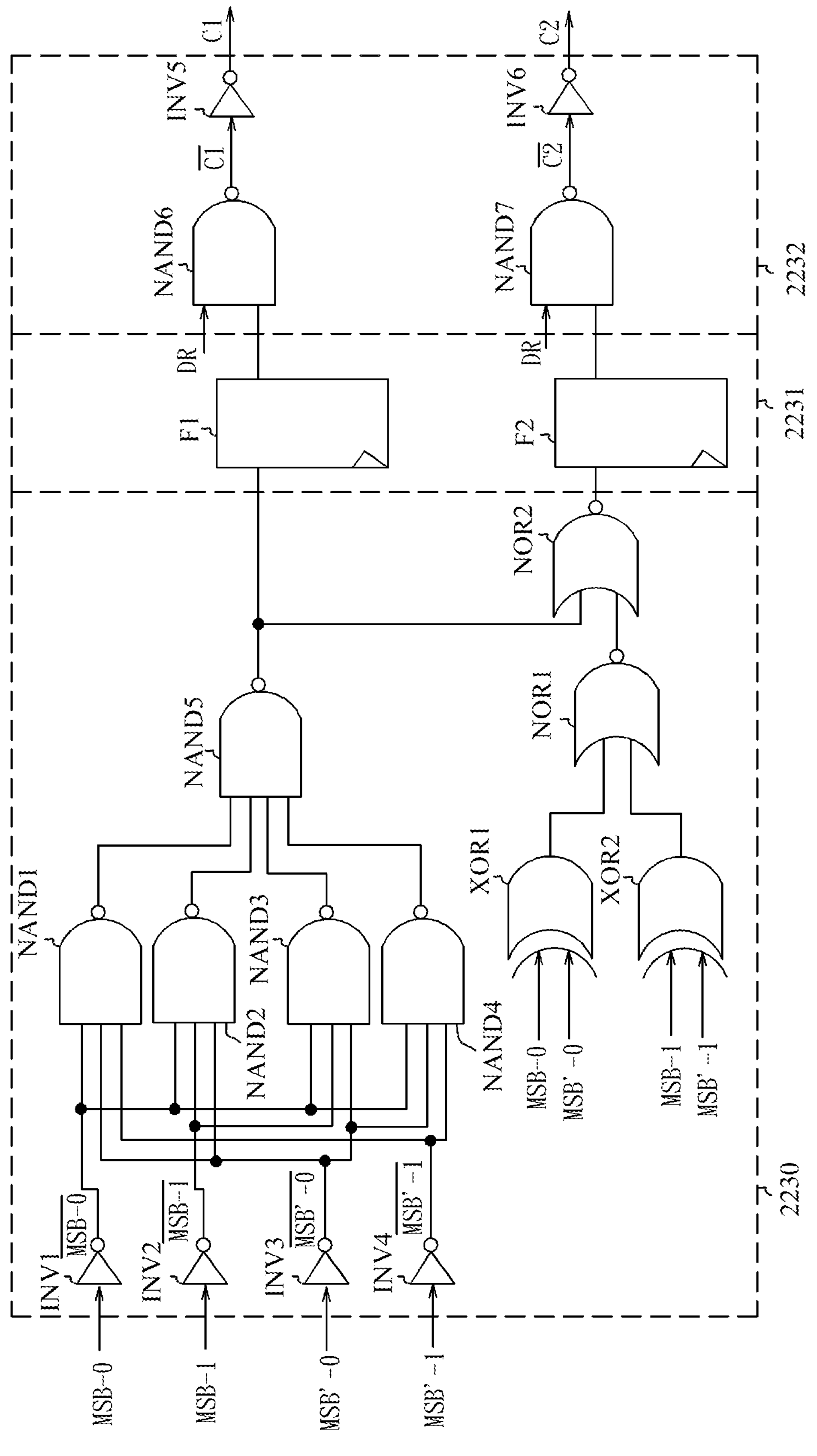
FIG. 9 is a diagram schematically illustrating a comparator according to another embodiment of the invention.

FIG. 9 is a diagram schematically illustrating a comparator according to another embodiment of the invention. The embodiment exemplifies four control signals. Referring to FIG. 9 and FIG. 7, the first logic circuit 2230 may include a first inverter INV1, a second inverter INV2, a third inverter INV3, a fourth inverter INV4, a first NAND gate NAND1, a second NAND gate NAND2, a third NAND gate NAND3, a fourth NAND gate NAND4, a fifth NAND gate NAND5, a first XOR gate XOR1, a second XOR gate XOR2, a first NOR gate NOR1, and a second NOR gate NOR2. The first inverter INV1 and the second inverter INV2 are coupled to the first latches 220. The third inverter NV3 and the fourth inverter NV4 are coupled to the second latches 221. The first NAND gate NAND1 is coupled to the first inverter NV1, the third inverter NV3, and the fourth inverter NV4. The second NAND gate NAND2 is coupled to the first inverter NV1, the second inverter NV2, and the third inverter NV3. The third NAND gate NAND3 is coupled to the first inverter NV1, the second inverter NV2, and the third inverter NV3. The fourth NAND gate NAND4 is coupled to the first inverter NV1, the third inverter NV3, and the fourth inverter NV4. The fifth NAND gate NAND5 is coupled to the first NAND gate NAND1, the second NAND gate NAND2, the third NAND gate NAND3, the fourth NAND gate NAND4, and the register 2231. The first XOR gate XOR1 is coupled to the first latches 220 and the second latches 221. The second XOR gate XOR2 is coupled to the first latches 220 and the second latches 221. The first NOR gate NOR1 is coupled to the first XOR gate XOR1 and the second XOR gate XOR2. The second NOR gate XOR2 is coupled to the first NOR gate NOR1, the fifth NAND gate NAND5, and the register 2231.

The first inverter INV1 receives the first-most significant bit MSB-0 to generate the inverted first-most significant bit $\overline{\text{MSB-0}}$. The second inverter INV2 receives the second-most significant bit MSB-1 to generate the inverted second-most significant bit $\overline{\text{MSB-1}}$. The third inverter INV3 receives the first-most significant bit MSB'-0 to generate the inverted first-most significant bit $\overline{\text{MSB'-0}}$. The fourth inverter INV4 receives the second-most significant bit MSB'-1 to generate the inverted second-most significant bit $\overline{\text{MSB'-1}}$. The first NAND gate NAND1 and the fourth NAND gate NAND4 receive the inverted first-most significant bit $\overline{\text{MSB-0}}$, the inverted first-most significant bit $\overline{\text{MSB'-0}}$, and the inverted second-most significant bit $\overline{\text{MSB'-1}}$. The second NAND gate NAND2 and the third NAND gate NAND3 receive the inverted first-most significant bit $\overline{\text{MSB-0}}$, the inverted second-most significant bit $\overline{\text{MSB-1}}$, and the inverted first-most significant bit $\overline{\text{MSB'-0}}$. The first XOR gate XOR1 receives the first-most significant bit $\overline{\text{MSB-0}}$ and the first-most significant bit $\overline{\text{MSB'-0}}$. The second XOR gate XOR2 receives the second-most significant bit $\overline{\text{MSB-1}}$ and the second-most significant bit $\overline{\text{MSB'-1}}$. The first logic circuit 2230 performs logic operation on the first-most significant bit $\overline{\text{MSB-0}}$, the second-most significant bit $\overline{\text{MSB-1}}$, the first-most significant bit $\overline{\text{MSB'-0}}$, and the second-most significant bit $\overline{\text{MSB'-1}}$, such that each of the fifth NAND gate NAND5 and the second NOR gate NOR2 generates a logic value.

The register 2231 may include a first D-flip flop F1 and a second D-flip flop F2. The first D-flip flop F1 is coupled to the fifth NAND gate NAND5. The second D-flip flop F2 is coupled to the second NOR gate NOR2. Each of the first D-flip flop F1 and the second D-flip flop F2 receives and stores the logic value.

The second logic circuit 2232 may include a sixth NAND gate NAND6, a fifth inverter INV5, a seventh NAND gate NAND7, and a sixth inverter INV6. The sixth NAND gate NAND6 is coupled to the first D-flip flop F1. The fifth inverter INV5 is coupled to the sixth NAND gate NAND6. The seventh NAND gate NAND7 is coupled to the second D-flip flop F2. The sixth inverter INV6 is coupled to the seventh NAND gate NAND7. The sixth NAND gate NAND6 receives the driving signal DR and the logic value to generate a first control signal $\overline{\text{C1}}$. The fifth inverter INV5 receives the first control signal $\overline{\text{C1}}$ to generate a first control signal C1. The seventh NAND gate NAND7 receives the driving signal DR and the logic value to generate a second control signal $\overline{\text{C2}}$. The sixth inverter INV6 receives the second control signal $\overline{\text{C2}}$ to generate a second control signal $\overline{\text{C2}}$. The architecture in FIG. 9 may be applied to the architecture in FIG. 4 or the other embodiments, but the invention is not limited to such the comparator 223 in FIG. 9.

Figure 10:
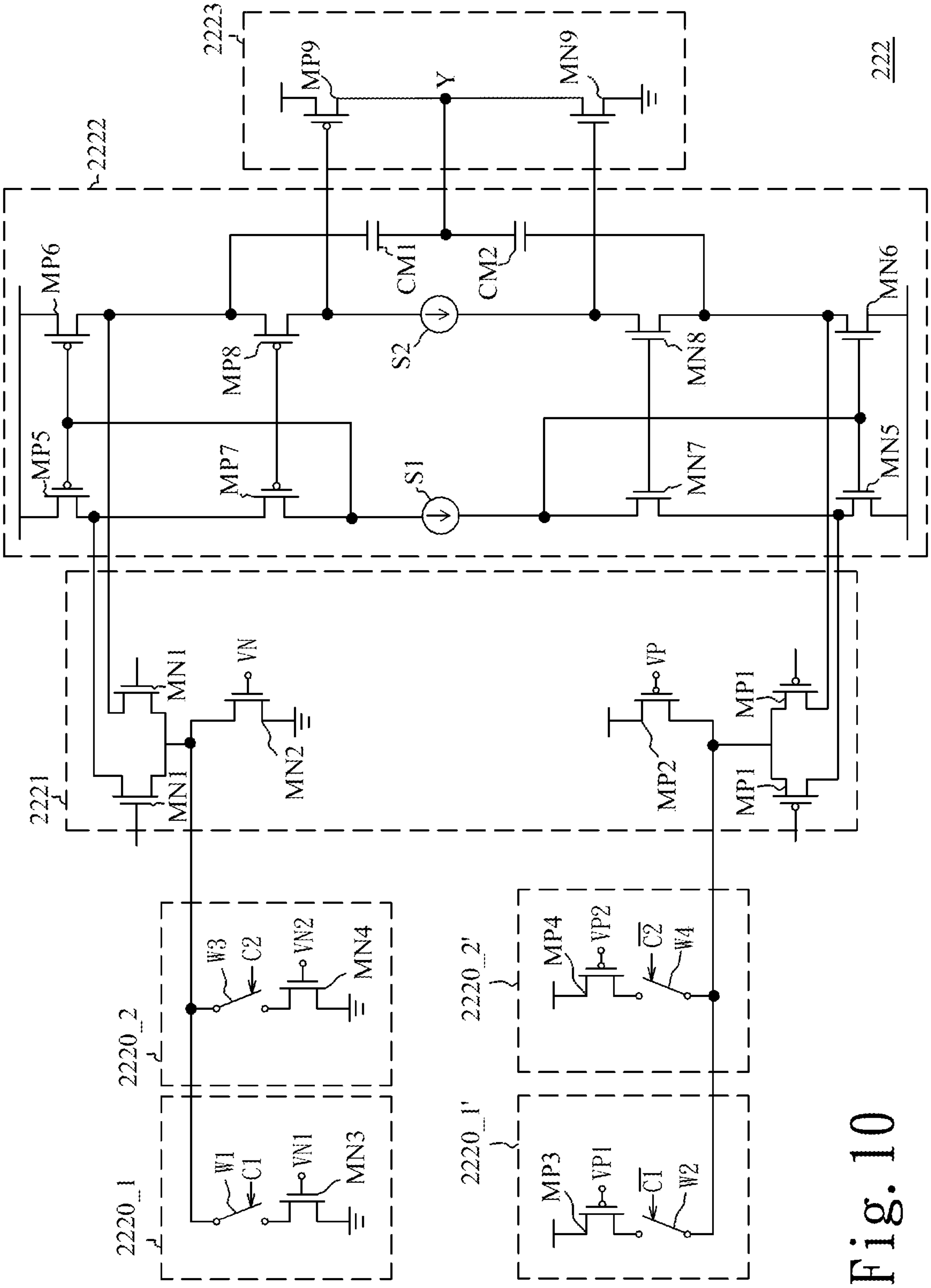
FIG. 10 is a diagram schematically illustrating an output buffer according to another embodiment of the invention.

FIG. 10 is a diagram schematically illustrating an output buffer according to another embodiment of the invention. The embodiment exemplifies four variable current sources. Referring to FIG. 4, FIG. 8, FIG. 9, and FIG. 10, the output buffer 222 may include two first variable current sources 2220_1 and 2220_1' and two second variable current sources 2220_2 and 2220_2'. The first currents of the first variable current sources 2220_1 and 2220_1' are equal. The second currents of the second variable current sources 2220_2 and 2220_2' are equal. Assume that the second current is greater than the first current. The input differential pair circuit 2221 may include two N-channel metal-oxide-semiconductor field effect transistors (NMOSFETs) MN1, an N-channel metal-oxide-semiconductor field effect transistor (NMOSFET) MN2, two P-channel metal-oxide-semiconductor field effect transistors (PMOSFETs) MP1, and a P-channel metal-oxide-semiconductor field effect transistor (PMOSFET) MP2. The NMOSFETs MN1 and the PMOSFETs MP1, coupled to the DAC 225, receive the input analog signal. The NMOSFET MN2 receives a high biasing voltage VN to serve as a constant current source. The PMOSFET MP2 receives a low biasing voltage VP to serve as a constant current source. The constant currents of the constant current sources are equal. The constant current sources, the first variable current sources 2220_1 and 2220_1', and the second variable current sources 2220_2 and 2220_2' may form the tail current source of the output buffer 222. The tail current of the tail current source is represented by I and formed by the constant current, the first current, and the second current. The first variable current sources 2220_1 and 2220_1' are respectively coupled to the sixth NAND gate NAND6 and the fifth inverter INV5. The second variable current sources 2220_2 and 2220_2' are respectively coupled to the seventh NAND gate NAND7 and the sixth inverter INV6. The first variable current source 2220_1 and the second variable current source 2220_2 are coupled in parallel. The first variable current source 2220_1' and the second variable current source 2220_2' are coupled in parallel.

The first variable current source 2220_1 may include an electrical switch W1 and an N-channel metal-oxide-semiconductor field effect transistor (NMOSFET) MN3. The electrical switch W1 is coupled to the fifth inverter INV5 the NMOSFETs MN1, MN2, and MN3. The NMOSFET MN3 receives a high biasing voltage VN1. The electrical switch W1 receives the first control signal C1 to be turned on or off. The first variable current source 2220_1' may include an electrical switch W2 and a P-channel metal-oxide-semiconductor field effect transistor (PMOSFET) MP3. The electrical switch W2 is coupled to the sixth NAND gate NAND6 and the PMOSFETs MP1, MP2, and MP3. The PMOSFET MP3 receives a low biasing voltage VP1. The electrical switch W2 receives the first control signal $\overline{\text{C1}}$ to be turned on or off.

The second variable current source 2220_2 may include an electrical switch W3 and an N-channel metal-oxide-semiconductor field effect transistor (NMOSFET) MN4. The electrical switch W3 is coupled to the sixth inverter INV6 and the NMOSFETs MN1, MN2, and MN4. The NMOSFET MN4 receives a high biasing voltage VN2. The electrical switch W3 receives the second control signal C2 to be turned on or off. The second variable current source 2220_2' may include an electrical switch W4 and a P-channel metal-oxide-semiconductor field effect transistor (PMOSFET) MP4. The electrical switch W4 is coupled to the seventh NAND gate NAND7 and the PMOSFETs MP1, MP2, and MP4. The PMOSFET MP4 receives a low biasing voltage VP2. The electrical switch W4 receives the second control signal $\overline{\text{C2}}$ to be turned on or off.

The gain stage circuit 2222 may include P-channel metal-oxide-semiconductor field effect transistors (PMOSFETs) MP5, MP6, MP7, and MP8, current sources S1 and S2, N-channel metal-oxide-semiconductor field effect transistors (NMOSFETs) MN5, MN6, MN7, and MN8, and capacitors CM1 and CM2. The PMOSFETs MP5, MP6, MP7, and MP8 are coupled to the NMOSFETs MN1. The NMOSFETs MN5, MN6, MN7, and MN8 are coupled to the PMOSFETs MP1. The slew rate can be defined as I/m1 or I/m2, where m1 and m2 are respectively the miller compensation capacitances of the capacitors CM1 and CM2.

The output stage circuit 2223 may include a P-channel metal-oxide-semiconductor field effect transistor (PMOSFET) MP9 and an N-channel metal-oxide-semiconductor field effect transistor (NMOSFET) MN9. The PMOSFET MP9 and the NMOSFET MN9, coupled to a node between the capacitors CM1 and CM2, output the output signal Y. The architecture in FIG. 10 may be applied to the architecture in FIG. 4 or the other embodiments, but the invention is not limited to such the output buffer 222 in FIG. 10.

Since the difference of the first data D1 and the second data D2 is obtained by comparing the first-most significant bits MSB-0 and MSB'-0 and the second-most significant bits MSB-1 and MSB'-1, the difference may be 0, 1, 2, or 3. Table 3 shows the difference, the first control signal C1, and the second control signal C2. According to Table 3, the tail current is higher when the difference is larger.

TABLE 3

| Difference | C2 | C1 |
|---|---|---|
| 0 | 0 | 0 |
| 1 | 0 | 1 |
| 2 | 1 | 0 |
| 3 | 1 | 1 |

Figure 11:
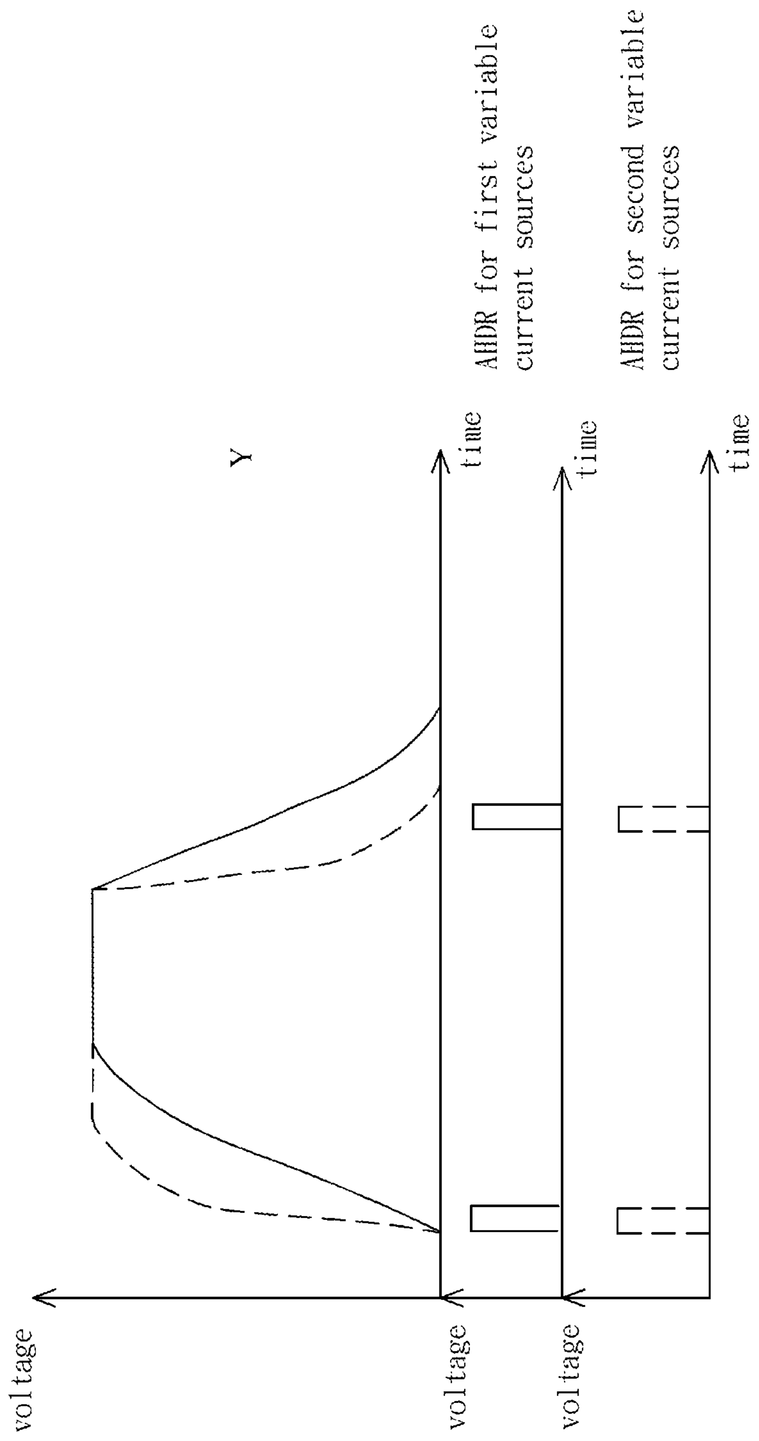
FIG. 11 is a diagram illustrating the waveforms of an output signal and adaptive high driving signals of a display driver according to an embodiment of the invention.

FIG. 11 is a diagram illustrating the waveforms of an output signal and adaptive high driving signals of a display driver according to an embodiment of the invention. Referring to FIG. 11 and FIG. 10, the electrical switches W1 and W2 are turned on when the voltage pulse of the adaptive high driving signal AHDR for the first variable current sources 2220_1 and 2220_1' is generated. The electrical switches W3 and W4 are turned on when the voltage pulse of the adaptive high driving signal AHDR for the second variable current sources 2220_2 and 2220_2' is generated. The output signal Y varies slowly when only the voltage pulse of the adaptive high driving signal AHDR for the first variable current sources 2220_1 and 2220_1' is generated. The output signal Y varies rapidly when the voltage pulses of the adaptive high driving signals AHDR for the first variable current sources 2220_1 and 2220_1' and the second variable current sources 2220_2 and 2220_2' are generated. In other words, increasing the number of the turned-on variable current sources can increase the slew rate of the output buffer 222.

Figure 12:
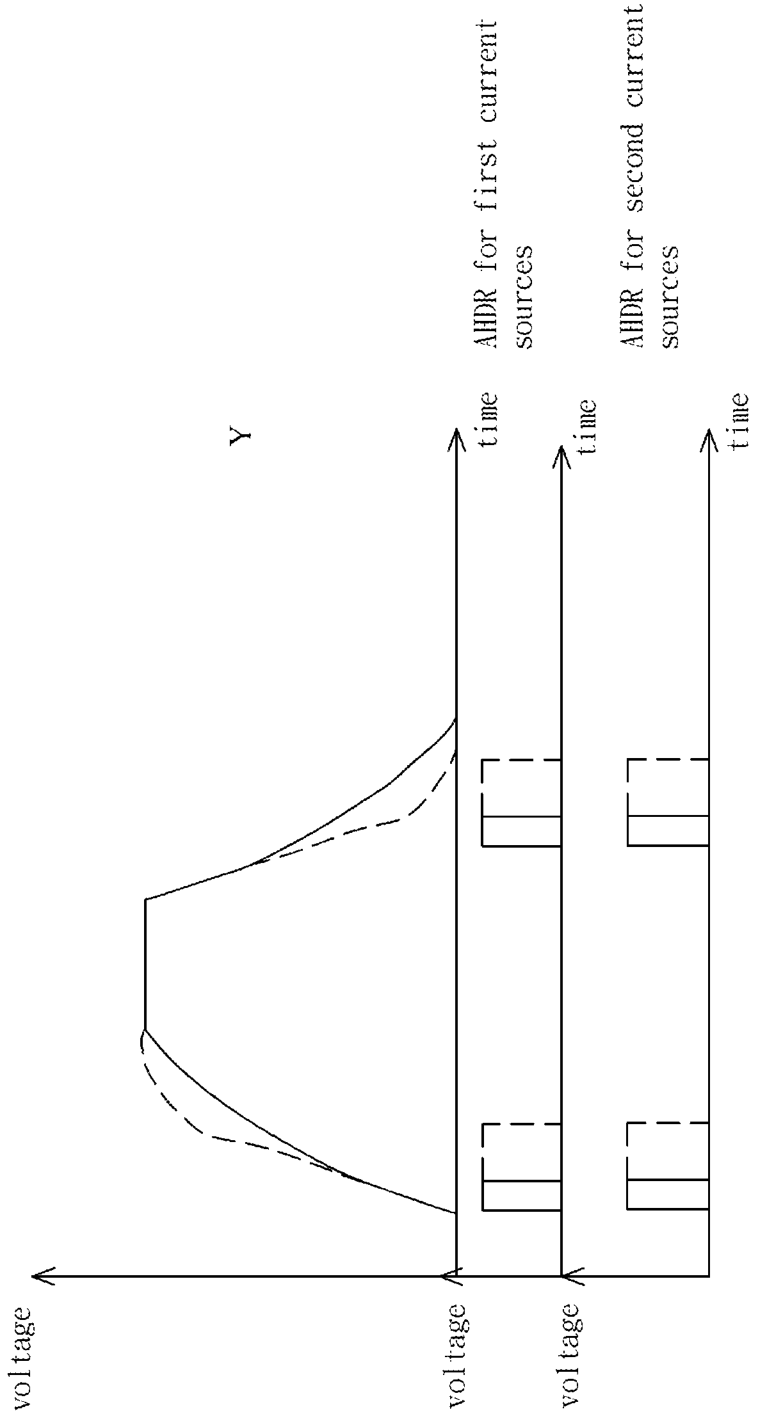
FIG. 12 is a diagram illustrating the waveforms of an output signal and adaptive high driving signals of a display driver according to another embodiment of the invention.

FIG. 12 is a diagram illustrating the waveforms of an output signal and adaptive high driving signals of a display driver according to another embodiment of the invention. Referring to FIG. 12 and FIG. 10, the output signal Y varies slowly when the voltage pulses of the adaptive high driving signals AHDR for the first variable current sources 2220_1 and 2220_1' and the second variable current sources 2220_2 and 2220_2' have narrower widths. The output signal Y varies rapidly when the voltage pulses of the adaptive high driving signals AHDR for the first variable current sources 2220_1 and 2220_1' and the second variable current sources 2220_2 and 2220_2' have wider widths. In other words, increasing the width of the voltage pulse of the adaptive high driving signal AHDR can increase the slew rate of the output buffer 222.

According to the embodiments provided above, the display driver and the driving method control the variable current source according to the given value and the difference between values of the first data and the second data, thereby reducing redundant power waste and heat and achieving the maximum power efficiency under a constant refresh rate.

The embodiments described above are only to exemplify the invention but not to limit the scope of the invention. Therefore, any equivalent modification or variation according to the shapes, structures, features, or spirit disclosed by the invention is to be also included within the scope of the invention.

What is claimed is:

1. A display driver for driving a display panel, comprising:
- at least one first latch configured to receive input data;
- at least one second latch with an input terminal thereof coupled to an output terminal of the at least one first latch;
- an output buffer, comprising at least one variable current source, coupled to the at least one second latch; and
- a comparator coupled to the at least one first latch, the at least one second latch, and the at least one variable current source and configured to generate at least one control signal of the at least one variable current source;
- wherein the comparator includes:
  - a first logic circuit coupled to the at least one first latch and the at least one second latch;
  - a register coupled to the first logic circuit; and
  - a second logic circuit coupled to the register and the at least one variable current source;
  - wherein the first logic circuit includes:
  - a first inverter and a second inverter coupled to the at least one first latch;
  - a third inverter and a fourth inverter coupled to the at least one second latch;
  - a first NAND gate coupled to the first inverter, the third inverter, and the fourth inverter;
  - a second NAND gate coupled to the first inverter, the second inverter, and the third inverter;
  - a third NAND gate coupled to the first inverter, the second inverter, and the third inverter;
  - a fourth NAND gate coupled to the first inverter, the third inverter, and the fourth inverter;
  - a fifth NAND gate coupled to the first NAND gate, the second NAND gate, the third NAND gate, the fourth NAND gate, and the register;
  - a first XOR gate coupled to the at least one first latch and the at least one second latch;
  - a second XOR gate coupled to the at least one first latch and the at least one second latch;
  - a first NOR gate coupled to the first XOR gate and the second XOR gate; and
  - a second NOR gate coupled to the first NOR gate, the fifth NAND gate, and the register.

2. The display driver according to claim 1, wherein the register includes:
- a first D-flip flop coupled to the fifth NAND gate; and
- a second D-flip flop coupled to the second NOR gate.

3. The display driver according to claim 2, wherein the at least one variable current source includes two first variable current sources and two second variable current sources.

4. The display driver according to claim 3, wherein the second logic circuit includes:
- a sixth NAND gate coupled to the first D-flip flop;
- a fifth inverter coupled to the sixth NAND gate;
- a seventh NAND gate coupled to the second D-flip flop; and
- a sixth inverter coupled to the seventh NAND gate, wherein the sixth NAND gate and the fifth inverter are respectively coupled to the two first variable current sources, and the seventh NAND gate and the sixth inverter are respectively coupled to the two second variable current sources.

5. The display driver according to claim 1, wherein the output buffer further includes:
- an input differential pair circuit coupled to the at least one second latch and the at least one variable current source;
- a gain stage circuit coupled to the input differential pair circuit; and
- an output stage circuit coupled to the gain stage circuit.

6. The display driver according to claim 1, wherein the at least one first latch includes a plurality of first latches, and the at least one second latch includes a plurality of second latches.

7. The display driver according to claim 1, further comprising a digital-to-analog converter coupled between the at least one second latch and the output buffer.

8. The display driver according to claim 7, further comprising a level shifter coupled between the digital-to-analog converter and the at least one second latch.

* * * * *